Dec. 10, 1968　　　C. G. MUNTERS　　　3,415,502
LIQUID AND GAS CONTACT BODY

Filed March 23, 1965　　　3 Sheets-Sheet 1

INVENTOR.

Dec. 10, 1968   C. G. MUNTERS   3,415,502
LIQUID AND GAS CONTACT BODY
Filed March 23, 1965

INVENTOR

Dec. 10, 1968   C. G. MUNTERS   3,415,502
LIQUID AND GAS CONTACT BODY
Filed March 23, 1965   3 Sheets-Sheet 3

INVENTOR.

United States Patent Office 3,415,502
Patented Dec. 10, 1968

3,415,502
LIQUID AND GAS CONTACT BODY
Carl Georg Munters, 3 Danderydsvagen,
Stocksund, Sweden
Filed Mar. 23, 1965, Ser. No. 441,961
Claims priority, application Sweden, Mar. 24, 1964,
3,667/64
4 Claims. (Cl. 261—112)

ABSTRACT OF THE DISCLOSURE

A contact body or exchanger packing composed of a plurality of layers or sheets bearing against one another. The sheets are corrugated or otherwise formed by wrinkling, creasing or grooving them to produce a plurality of channels between the sheets. The sheets are preferably composed of plastic material and in addition to the corrugations in them, the sheets are undulated or provided with transverse folds extending angularly across the channels. The folds cross one another in adjacent sheets and the apices of the folds are preferably spaced apart for distances greater than the distances between the apices of the channels.

---

This invention relates to a contact body or exchanger packing for interaction of two fluids, primarily water and air.

More particularly this invention relates to a contact body or exchanger packing for bringing about an interaction between water and air, said body or packing being provided with folded or corrugating layers or sheets bearing against one another, channels or passages penetrating from end to end being formed between said layers or sheets and intended to be passed simultaneously by both fluids.

A particularly important field of application is constituted by cooling towers within which the water is cooled by a minor portion thereof being allowed to evaporate into the air. To attain high efficiency of exchange it is important that the liquid is distributed over the largest possible part of the layer or sheet surfaces of the contact body. For this purpose the layers or sheets have been made of wetting or absorbing material, such as fibers or cellulose or asbestos. It has also been proposed to make the layers or sheets of synthetic plastic which material in itself has many favorable properties. Thus it is not attacked by putrefaction or similar deteriorating processes and some types of plastic material, such as polyvinyl chloride are difficultly inflammable.

However, layers or sheets of synthetic plastic material are not water absorbing or poorly wetting for which reason the water contracts to form runs or streams which heavily reduce the relation between the size of the layer or sheet surface wetted by the water and the total layer surface. The bad adherence of the aqueous film thus obtained with plastic material has, however, not only the drawback that portions of the surfaces remain dry. The flow of water can easily be disturbed and it may happen that the water under action of external forces divert substantially from the path destined for it so that a considerably stronger flow is obtained in some zones whereas in other zones the flow becomes considerably less powerful. This influences the capacity of the cooling tower in a negative direction not only due to the fact that some surfaces remain inactive, but one has also to calculate with a deterioration of the capacity by the relation between the quantities of media streaming in each individual section not reaching the value calculated with. If thus the water quantity in some portion of the tower essentially exceeds the medium water quantity intended it is obvious that the air quantity simultaneously passing through the same portion of the tower becomes too small to obtain the desired cooling effect. Thus it is particularly important for an effective utilization of the surfaces and the media passing over the surfaces that, firstly, the surfaces to so high degree as possible are covered by a streaming water film, and, secondly, the flow in this film is as uniform as possible.

The drawbacks of plastic material are particularly evident in towers operating according to the cross-stream principle within which thus the air and the water pass through the contact body at right angle relative one another. In this case the air acts on the water with a force which in general is directed perpendicularly to the path intended for the water and the result will be a considerable deviation therefrom.

During recent years, use to a large extent has been made of contact bodies or exchanger packings provided with very narrow passageways, such as narorw interspaces between the layers or sheets or tubes with small diameter because these structures offer large surface areas, high transfer coefficients and therewith high capacity per unit volume. However, such structures call for surfaces with good water absorbing or film forming properties to avoid that the water bridges over the passageways and thereby blocks them against the transgress of the air. Plastic material has no favorable properties in this respect, but should demand considerably larger channels or passageways.

It is one main feature of the invention to overcome the drawbacks set forth hereinbefore by providing a structure for contact bodies or exchanger packings mainly consisting of synthetic plastic material, which offers high transfer coefficients in spite of wide passageways and which, moreover, is adapted to maintain good spread and distribution of the water over the layer or sheet surfaces. According to one main feature of the invention the folds or corrugations of the layers or sheets made of plastic material form an angle with one another in adjacent layers. In this way the water is spread due to continuous alterations of direction along the folds crossing one another in a particularly favorable manner over the layer or sheet surfaces. A contributing factor to attain this favorable effect is constituted by the feature that a commencing collection of water at one place of the layer or sheet surfaces is broken up rapidly when the next following change of direction occurs during the flow of the water from one fold to the other along the interspace between two layers or sheets. The air, too, is subjected to a continuous action by the incessant change of the size and the width of the interspaces causing the air to flow under favorable conditions for producing a high transfer coefficient between the two media per surface unit of the layers or sheets.

Particularly advantageous results have been obtained with certain angles between the main direction of flow of the air and the folds crossing one another. When the angle between the direction of the air and the folds is small so that the folds extend almost in parallel with the direction of flow of the air the turbulence of the air becomes insignificant and thereby the coefficient of transfer of heat or moisture low. With increasing angle also the number of diversions or turns of the air per length unit is increased and thereby rising transfer coefficients are attained rendering possible to reduce the dimension of the contact body in the direction of flow of the air. When exceeding certain angles between the main direction of flow of the air and the folds the diversions or turns and the turbulences become, however, so vigorous that the film of flowing water is torn off or detached and the water tends to follow with the air and to clog within the channels. This results in heavy increases of the pressure fall for the air during its passage through the contact body. There is thus a range within which an optimum of cooling effect is attained in relation to sacrificed pressure fall. It has been stated that favorable results are attained when the angles between the folds viewed in the direction of flow of the air are kept between 50 and 70 up to 85°. It has thus been possible to attain the same cooling effect in a cooling tower with only half the partition which is required for contact bodies made with layers or sheets of water absorbing material forming parallel tubular channels.

Further objects and advantages of the invention will become apparent from the following description, considered in connection with the accompanying drawings, which form part of this specification, and of which:

Figure 7:
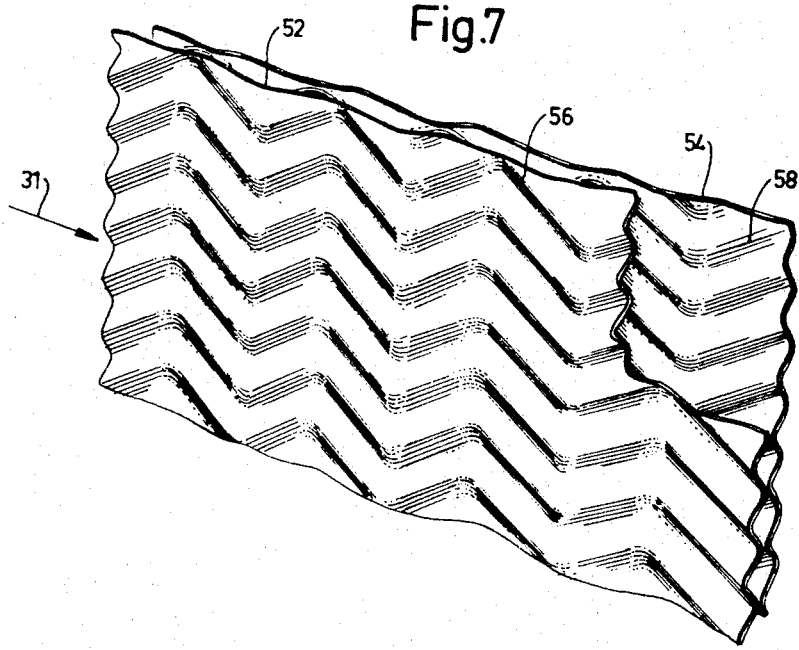

FIG. 7, finally, is a perspective view of a contact body according to still another embodiment of the invention.

Figure 1:
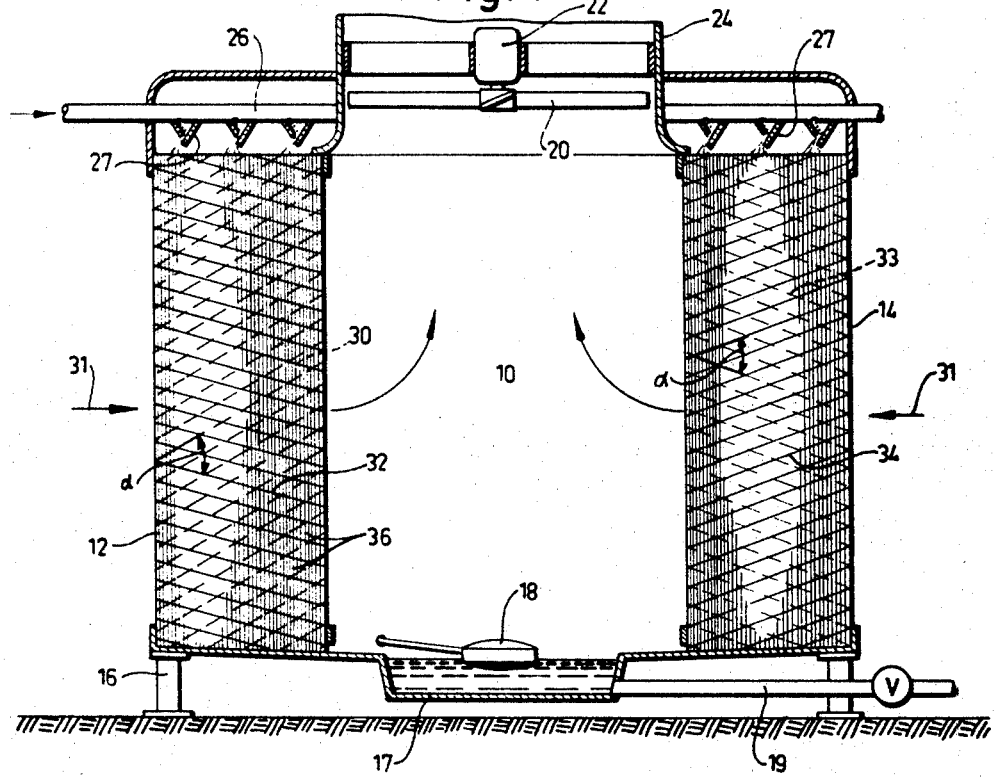
FIG. 1 is a vertical longitudinal section through a cooling tower provided with contact bodies or exchanger packings having the structure of the invention.
Figure 2:
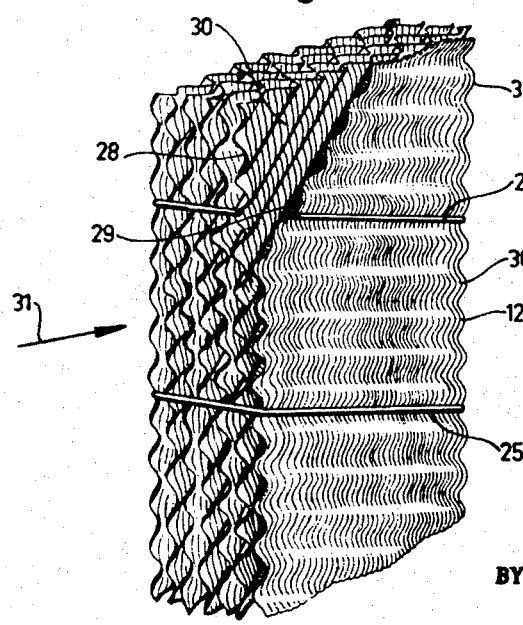
FIG. 2 is a perspective view of a portion of a contact body or exchanger packing.
Figure 3:
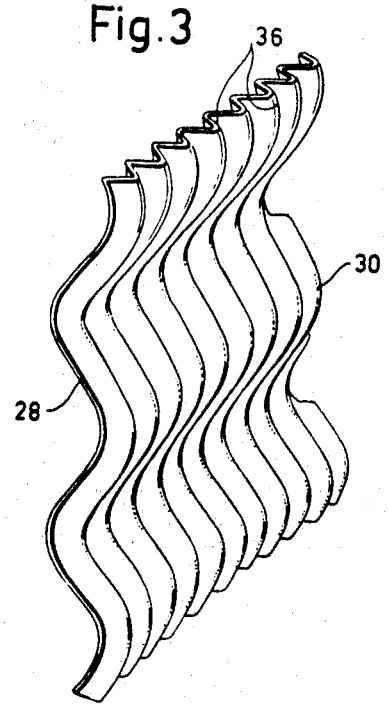
FIG. 3 is a perspective view in a larger scale of a portion of a contact body provided with vertically extending fine creases or wrinkles.

Referring to the drawings, the embodiment represented in FIGS. 1 to 3 relates to a cooling tower having a casing 10 of square configuration with two opposite openings in which contact bodies or exchanger packings 12 and 14, respectively, are located. The casing 10 rests on feet 16 and forms at its base a liquid collecting basin 17 the water level of which is controlled by a float 18 admitting supply of fresh water, and which has a drain 19 for the cooled water. Air is introduced through the lateral openings in the casing to the contact bodies 12, 14 and is sucked up from said bodies through a central portion of the tower by a fan 20 which is driven by a motor 22 and disposed in a tubular outlet 24. Water is supplied to the contact bodies 12, 14 from above through a conduit 26 on the base of which transverse troughs 27 with escape holes along the rectangular upper front area of the bodies are provided.

The contact bodies 12 and 14, respectively, are composed of thin layers or sheets 28, 29 which preferably all have folds or corrugations crossing one another in adjacent layers. Preferably the folds are substantially formed following a sine curve or smoothly rounded between ridges and depressions. The layers bear against one another and are particularly during transportation and assemblage kept together by means of a bandage formed by wires 25, strips, metal wire, nets of metal wire or plastic straps or the like. If desired, the layers may be glued together at the points of contact by means of a suitable bonding agent, such as a contact glue or by means of a locally applied solvent for the plastic material. The layers are constituted by a preferably synthetic plastic material which may be difficultly combustible, such as polyvinyl chloride. The contact body has interspaces or passageways extending from end to end in both the horizontal and the vertical directions with incessantly varying width from zero at the points of contact between the layers to the double value of the height of the corrugations. The height of the corrugations of the individual sheets may amount to between 5 and 10 up to 15 millimeters and even more.

The contact body 12 or exchanger body shown in the left part of FIG. 1 and in FIG. 2 has different angles of inclination of the corrugations or folds in every second layer. Thus the corrugations 30 which are directed upwardly viewed in the direction 31 of the horizontal flow of the air are inclined towards the horizontal plane at a steeper angle than the corrugations 32 which extend downwardly. The result is that means are provided within the contact body which have a retaining effect on the water flowing from the top downwards so that said water to a smallest possible extent is entrained by the air current.

The contact body 14 shown in FIG. 1 at right hand, however, has the same angle of inclination of the corrugations or folds 33, 34 in all layers. Of course, the two contact bodies may both have the same structure.

The angle formed between the folds 30, 32 and 33, 34, respectively, should preferably be acute and not substantially exceed 60 to 80°. As a lowest limit 35 to 40° may be mentioned. The angle of inclination of the folds 32 and 30, respectively, to the horizontal plane may vary between 0° and about 50°. The folds 32 may also have an upwardly directed inclination which means in inclination in the same direction as the folds 30 though with a minor angle. The angle of inclination of the folds 33, 34 toward the horizontal plane is of the same order of magnitude, viz $\alpha/2$.

Besides of these larger folds the layers or sheets are preferably formed with fine depressions which in the embodiment shown in the FIGS. 1 to 3 have the shape of creases or wrinkles 36 which may have a depth of between 0.5 to 1.0 to 3.0 millimeters and a cross-sectional contour resembling of an isosceles or equilateral triangle. In the embodiment shown in FIGS. 1 to 3 the creases 36 extend substantially vertically. The creases 36 prevent water from being entrained laterally by the air stream and also facilitate the spreading of the water over the layer or sheet surface. To produce this effect the creases 36 have such cross-section as to cause the water to adhere and to follow the longitudinal direction thereof. The creases are substantially parallel to one another and cross the larger folds.

Figure 4:
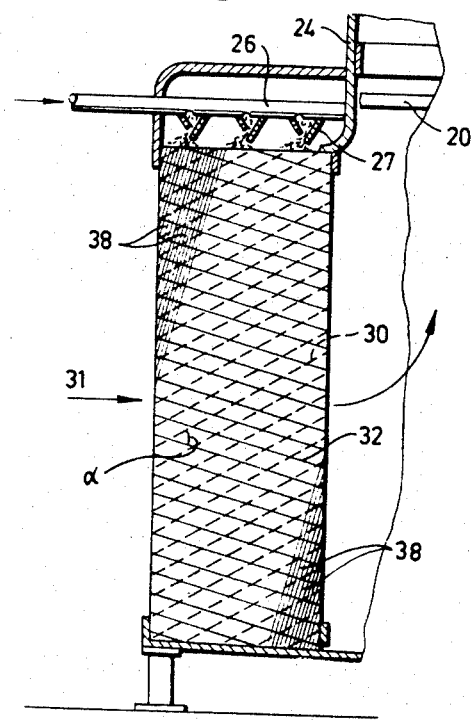
FIG. 4 is a vertical longitudinal section of a portion of the cooling tower embodying a slightly modified embodiment of the invention.

Instead as to extend transversally as shown in FIG. 3 the creases 38 may be disposed at an angle as will be seen from FIG. 4 so as to extend obliquely downwardly and outwardly towards the inlet opening for the air entering the cooling tower. Thereby additional safety is won that the water is distributed uniformly over the surface of the layers. By the creases 38 the water gets an actuation in the horizontal direction which is opposite to the direction 31 of the air flow. The creases tend to guide the water towards that lateral edge of the layer where the air enters between said layer. Hereby the air is prevented from concentrating the water flow in a direction towards the outlet edge for the air. This tendency to lateral displacement manifests itself in the same degree as the creases are made flat or be given a soft contour. With deep or sharp depressions or creases surface tension comes into existence, in particular when the dimensions of the depressions are reduced causing the water to adhere more actively in the depression or creases.

Figure 5:
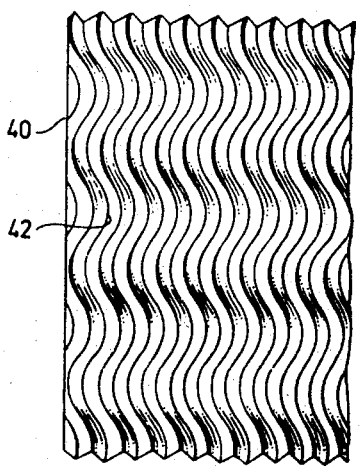
FIG. 5 is a lateral view of a layer or sheet provided with creases according to an alternative embodiment of the invention.

In the embodiment represented in FIG. 5, the contact body is composed of layers 40 which are shown in lateral elevation and which have fine creases 42. These differ from the preceding embodiments by the feature that they form so-called slingering wells which means that the creases viewed at right angle towards the plane of the layer 40 have sine or similar shape. In FIG. 5 there are no large folds crossing the creases 42 at an acute angle to the main direction of said creases, but such folds may also be used in this embodiment. The particular advantage with this form of slingering well is that the individual water streams in the creases due to the incessantly changed direction of flow require more time to pass over the layer or sheet from the upper of the lower edge thereof and thereby increase the time of contact between the water and the air.

Figure 6:
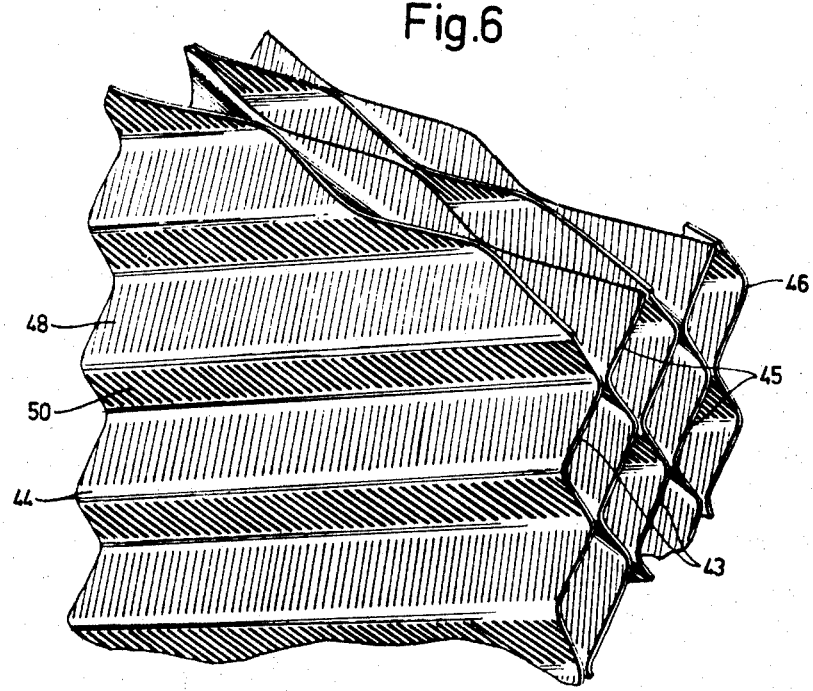
FIG. 6 is a perspective lateral projection of still another modification of a layer or sheet provided with modified creases.

The embodiment represented in FIG. 6 has layers 43, 45 which in the same manner as in the embodiments of FIGS. 2 and 3 have large folds or corrugations such as 44, 46 which in adjacent layers form an angle with one another. The folds are crossed by creases 48, 50 which in this embodiment are not coherent but interrupted by smooth zones of the layers at the crests of the folds. Although in this embodiment the creases are not coherent in the vertical extension of the layers but are interrupted by said smooth zones substantially the same effect is attained, namely a positive leading of the water in the lateral direction against the action of the horizontal air current. From the point of view of production the embodiment in consideration is to be preferred in some cases. The folds 44, 46 have a relatively small radius of curvature at the crest proper whereas the lateral portions between the crest and the depressions may be straight or approximately straight.

FIG. 7 illustrates an embodiment of the invention wherein the layers 52, 54 made of plastic material are formed with large folds or corrugations 56 and 58, respectively the main directions of which may be parallel to one another in two adjacent layers. The folds 56, 58 are not straight as in the preceding embodiments but follow a zigzag or sine curve or a so called slingering well in relation to the plane of the layers. If thus the air streams as indicated by the arrow 31 it will incessantly meet variations in cross-section during its passage between the layers 52, 54. At the same time the water is guided so much as to be prevented from being laterally displaced by the air draft. However, the layers may in addition be provided with creases or the like means adapted to guide or to distribute the water.

The fine depressions, "the microstructures" are thus as will be evident from the statements hereinbefore, located on the folds or corrugations proper which latter may be denominated as "macrostructures." By the collaboration between said two structures extremely favorable conditions are obtained for the intended exchange between the two media. The thermoplastic layers are heated and disposed in molds having an appropriate form to produce the desired structure of the layers or sheets. The forming may be effected by means of a vacuum. The mold may be of a fine wire net which at the same time by a folding procedure forms the microstructure in which case the microstructure corresponds to the meshes of the wire net and thus may show crosswise extending longitudinal projections which form rows at right angles interrupting one another.

The contact body may be composed of horizontally superimposed discs constituted by layers of plastic material formed and composed as described above which discs thus in assembled state form a contact body of desired vertical dimension.

While several more or less specific embodiments of the invention have been shown and described, it is to be understood that this is for purpose of illustration only, and that the invention is to be determined by the appended claims.

I claim:
1. A contact body or exchanger packing in a contact apparatus for producing interaction between water and air, said body being composed of folded corrugated layers bearing against one another, passageways formed by the corrugations and extending from end to end in the layers to be passed simultaneously by the water and air, the layers being composed of a plastic material with the folds in the adjacent layers forming an angle relatively to one another, the folds having their apices spaced apart at greater distances than the distances between the apices of the corrugations, and the folds crossing the corrugations.

2. A contact body or exchanger packing in a contact apparatus for producing interaction between water and air, said body being composed of sheets provided with channels extending from end to end in the sheets, the sheets bearing against one another, the sheets being undulated in a direction across the channels to produce spaced folds which extend angularly across the channels and at an angle thereto, the sheets being composed of plastic material.

3. A contact body according to claim 2, wherein the angle of inclination of the folds to the direction of water flow is greater than the angle of inclination of the folds to the direction of air flow.

4. A contact body according to claim 2, wherein the folds in adjacent layers form an angle relative to one another which amounts to 40 to 80° viewed in the main direction of flow of the air.

References Cited

UNITED STATES PATENTS

| 2,793,017 | 5/1957 | Lake | 261—112 |
| 3,262,682 | 7/1966 | Bredberg | 261—112 |
| 3,285,587 | 11/1966 | Huber | 261—112 XR |

FOREIGN PATENTS 1,115,750  10/1961  Germany.

HARRY B. THORNTON, *Primary Examiner.*

TIM R. MILES, *Assistant Examiner.*